(12) United States Patent
Yoshimoto et al.

(10) Patent No.: US 12,516,715 B2
(45) Date of Patent: Jan. 6, 2026

(54) CONTINUOUSLY VARIABLE TRANSMISSION MECHANISM

(71) Applicant: Yoshimoto Kiko Co., Ltd., Minamata (JP)

(72) Inventors: Ryosuke Yoshimoto, Moriyama (JP); Takehiko Yoshimoto, Kumamoto (JP)

(73) Assignee: YOSHIMOTO KIKO CO., LTD., Minamata (JP)

( * ) Notice: Subject to any disclaimer, the term of this patent is extended or adjusted under 35 U.S.C. 154(b) by 0 days.

(21) Appl. No.: 18/728,341

(22) PCT Filed: Dec. 20, 2023

(86) PCT No.: PCT/JP2023/045798
§ 371 (c)(1),
(2) Date: Jul. 11, 2024

(87) PCT Pub. No.: WO2024/135750
PCT Pub. Date: Jun. 27, 2024

(65) Prior Publication Data
US 2025/0102046 A1   Mar. 27, 2025

(30) Foreign Application Priority Data

Dec. 21, 2022 (JP) .................................. 2022-204535
Feb. 28, 2023 (JP) .................................. 2023-029562

(51) Int. Cl.
*F16H 3/06* (2006.01)
*F16H 3/42* (2006.01)

(52) U.S. Cl.
CPC .................. *F16H 3/06* (2013.01); *F16H 3/42* (2013.01)

(58) Field of Classification Search
CPC . F16H 3/06; F16H 15/04; F16H 15/06; F16H 3/42
See application file for complete search history.

(56) References Cited

U.S. PATENT DOCUMENTS

2007/0272048 A1* 11/2007 Vanmoor .................. F16H 3/42
74/348

FOREIGN PATENT DOCUMENTS

FR           489162 A   * 12/1918
JP        H10-176740 A    6/1998
(Continued)

OTHER PUBLICATIONS

JPO, Office Action for the corresponding Japanese patent application No. 2022-204535, mailed May 7, 2024, with machine English translation, 6 pages.
(Continued)

*Primary Examiner* — William C Joyce
(74) *Attorney, Agent, or Firm* — LUCAS & MERCANTI, LLP

(57) ABSTRACT

A continuously variable transmission mechanism includes: a worm gear body on an input side that is formed such that a spiral pitch of a screw gear having a spiral shape and formed on a peripheral surface of a gear shaft body is gradually changed; a wheel gear body on an output side that is formed such that a meshing position where the wheel gear body meshes with the worm gear body is adjustable so as to allow the wheel gear body to mesh with the worm gear body at an arbitrary position; and an adjustment operation unit that is connected with the wheel gear body, the worm gear body, or both of the wheel gear body and the worm gear body in an interlocking manner so as to adjust the meshing position where the worm gear body and the wheel gear body mesh with each other.

4 Claims, 14 Drawing Sheets

(56) References Cited

FOREIGN PATENT DOCUMENTS

| | | |
|---|---|---|
| JP | 2008-309251 A | 12/2008 |
| JP | 2015-098900 A | 5/2015 |
| JP | 2020-176717 A | 10/2020 |
| WO | WO-2009113904 A1 * | 9/2009 ............. F16H 3/423 |

OTHER PUBLICATIONS

International Search Report mailed Jan. 23, 2024, issued for the corresponding International patent application No. PCT/JP2023/045798, with English translation, 5 pages.

Decision of Refusal, issued for the corresponding Japanese patent application No. 2022-204535, mailed Dec. 3, 2024, with English machine translation, 6 pages.

\* cited by examiner

Prior Art

CONTINUOUSLY VARIABLE TRANSMISSION MECHANISM

CROSS REFERENCE TO RELATED APPLICATION

This Application is a 371 of PCT/JP2023/045798 filed on Dec. 20, 2023, which, in turn, claims priority of Japanese Patent Application No. 2022-204535 filed on Dec. 21, 2022 and Japanese Patent Application No. 2023-029562 filed on Feb. 28, 2023, and the above applications are incorporated herein by reference.

FIELD OF THE INVENTION

The present invention relates to a continuously variable transmission mechanism that can perform not only the reduction of a speed but also a change of the speed.

DESCRIPTION OF THE RELATED ART

Conventionally, as one of speed reduction mechanisms, there has been known a worm speed reduction mechanism that is constituted of: a worm gear body formed of a screw gear (screw shaft) that is a kind of a helical gear; and a wheel gear body that meshes with the worm gear body, is formed of a spur gear or a helical gear, and has a larger diameter than the worm gear body in general (see Japanese Laid-open Publication No. 2008-309251).

FIG. 9 is a perspective view illustrating a conventional worm gear speed reduction mechanism. Usually, as illustrated in FIG. 9, by using a worm gear body W1 that is a screw gear as an input shaft IS and using a wheel mounting shaft on which a wheel gear body W2 is mounted as an output shaft OS, the output shaft OS can be rotated with a large speed reduction ratio (for example, 10 or more) with respect to the input shaft IS. Further, worm speed reduction mechanism is also characterized in that the direction of the output shaft OS is set to the intersecting direction with respect to the input shaft IS including the direction that is perpendicular to the input shaft IS.

CITATION LIST

Patent Literature

Patent Literature 1: JP S54-034280 A

SUMMARY OF THE INVENTION

Technical Problem

However, in the above-mentioned conventional worm speed reduction mechanism, a spiral pitch of the gear tooth W11 of the worm gear body W1 that mesh with gear teeth W21 of the wheel gear body W2 is a constant or fixed value and hence, although the speed reduction can be performed with a large speed reduction ratio, the speed reduction ratio cannot be changed. Accordingly, to change the speed reduction ratio, it is necessary to additionally use an inverter or the like. However, the inverter or the like is expensive and hence, the conventional speed reduction mechanism has a drawback in terms of cost.

The present invention is made in view of such circumstances, and it is an object of the present invention to provide a continuously variable transmission mechanism that can mechanically perform continuous transmission in addition to the speed reduction without using an expensive device such as an inverter.

Means for Solving Problem

To overcome the above-mentioned drawback, a continuously variable transmission mechanism according to the present invention includes: a worm gear body on an input side that is formed such that a spiral pitch of a screw gear having a spiral shape and formed on a peripheral surface of a gear shaft body is gradually changed; a wheel gear body on an output side that is formed such that a meshing position where the wheel gear body meshes with the worm gear body is adjustable so as to allow the wheel gear body to mesh with the worm gear body at an arbitrary position; and an adjustment operation unit that is connected with the wheel gear body, the worm gear body, or both of the wheel gear body and the worm gear body in an interlocking manner so as to adjust the meshing position where the worm gear body and the wheel gear body mesh with each other and a meshing state of the worm gear body and the wheel gear body, wherein a gear rotational speed from an input side is changeable to a gear rotational speed on the output side in a continuously variable manner by an operation of the adjustment operation unit.

Further, a continuously variable transmission mechanism according to the present invention includes: a wheel gear body having an elongated rod shape where gear teeth are formed on a peripheral surface of the wheel gear body; and a worm gear body that meshes with the gear teeth formed on the peripheral surface of the wheel gear, wherein the wheel gear body is formed in a tapered shape where a diameter of the wheel gear body is gradually increased or decreased from one end to the other end of the wheel gear body, the worm gear body is configured to allow a gear tooth formed on a peripheral surface thereof to mesh with the gear teeth formed on the peripheral surface of the wheel gear body, and is movable along the peripheral surface of the wheel gear body, and a rotational speed of the worm gear body is transmitted to the wheel gear body in a state where a rotational speed of the worm gear body is changed in a continuously variable manner corresponding to a gear position on the peripheral surface of the wheel gear body with which the worm gear body meshes.

Effects of the Invention

According to the present invention, the continuously variable transmission mechanism includes: the worm gear body on an input side that is formed such that the spiral pitch of the screw gear having a spiral shape and formed on the peripheral surface of the gear shaft body is gradually changed; the wheel gear body on the output side that is formed such that the meshing position where the wheel gear body meshes with the worm gear body is adjustable so as to allow the wheel gear body to mesh with the worm gear body at an arbitrary position; and the adjustment operation unit that is connected with the wheel gear body, the worm gear body, or both of the wheel gear body and the worm gear body in an interlocking manner so as to adjust the meshing position where the worm gear body and the wheel gear body mesh with each other, wherein a gear rotational speed from an input side is changeable to a gear rotational speed on the output side in a continuously variable manner by an operation of the adjustment operation unit. With such a configuration, it is possible to acquire an advantageous effect that it is possible to provide the continuously variable transmission mechanism that can mechanically perform the continuous transmission in addition to the speed reduction without using an expensive device such as an inverter.

BRIEF DESCRIPTION OF THE DRAWINGS

FIG. 4 is a view illustrating the wheel gear body according to the first embodiment of the present invention, wherein FIG. 4(a) is a plan view, and FIG. 4(b) is a cross-sectional view taken along a line A-A in FIG. 4(a).

FIG. 5 is a view of the worm gear body formed of a screw gear that is used in the continuously variable transmission mechanism according to the first embodiment of the present invention, wherein FIG. 5(a) is a plan view, and FIG. 5(b) is a cross-sectional view taken along a line B-B in FIG. 5(a).

FIG. 6 is an explanatory view illustrating modes of the worm gear body according to the first embodiment of the present invention, wherein FIG. 6(a) is a view illustrating a case where an intersecting angle is 15 degrees, FIG. 6(b) is a view illustrating a case where the intersecting angle is 30 degrees, and FIG. 6(c) is a view illustrating a case where an intersecting angle is 60 degrees.

FIG. 7 is an explanatory view illustrating modes of the wheel gear body according to the first embodiment of the present invention, wherein FIG. 7(a) is a view illustrating a state where the wheel gear body is translated, and FIG. 7(b) is a view illustrating a state where the wheel gear body is rotated about a pivot axis.

FIG. 8 is an explanatory view illustrating a change in tooth shape of a meshing tooth (cog) at a predetermined pitch of the worm gear body according to the first embodiment of the present invention, wherein FIG. 8(a) is a view illustrating a portion of the worm gear body, FIG. 8(b) is a cross-sectional view taken along a line C-C in FIG. 8(a) and FIG. 8(c) is a cross-sectional view taken along a line D-D in FIG. 8(a), and FIG. 8(d) is a cross-sectional view taken along a line E-E in FIG. 8(a).

DETAILED DESCRIPTION OF THE PREFERRED EMBODIMENT

The gist of the present invention lies in a continuously variable transmission mechanism that includes: a worm gear body disposed on an input side of the continuously variable transmission mechanism that is formed such that a spiral pitch of a screw gear having a spiral shape and formed on a peripheral surface of a gear shaft body is gradually changed; a wheel gear body disposed on an output side of the continuously variable transmission mechanism that is formed such that a meshing position where the wheel gear body meshes with the worm gear body is adjustable so as to allow the wheel gear body to mesh with the worm gear body at an arbitrary position; and an adjustment operation unit that is connected with the wheel gear body, the worm gear body, or both of the wheel gear body and the worm gear body in an interlocking manner so as to adjust the meshing position where the worm gear body and the wheel gear body mesh with each other, wherein a gear rotational speed from the input side is changeable to a gear rotational speed on the output side in a continuously variable manner by an operation of the adjustment operation unit.

Further, the present invention also provides a continuously variable transmission mechanism that includes: a wheel gear body having an elongated rod shape where gear teeth are formed on a peripheral surface of the wheel gear body: and a worm gear body that meshes with the gear teeth formed on the peripheral surface of the wheel gear, wherein the wheel gear body is formed in a tapered shape where a diameter of the wheel gear body is gradually increased or decreased from one end to the other end of the wheel gear body, the worm gear body is configured to allow a gear tooth formed on a peripheral surface thereof to mesh with the gear teeth formed on the peripheral surface of the wheel gear body, and is movable along the peripheral surface of the wheel gear body, and a rotation of the worm gear body is transmitted to the wheel gear body in a state where a rotational speed of the worm gear body is changed in a continuously variable manner corresponding to a gear position on the peripheral surface of the wheel gear body with which the worm gear body meshes.

First Embodiment

Figure 1:
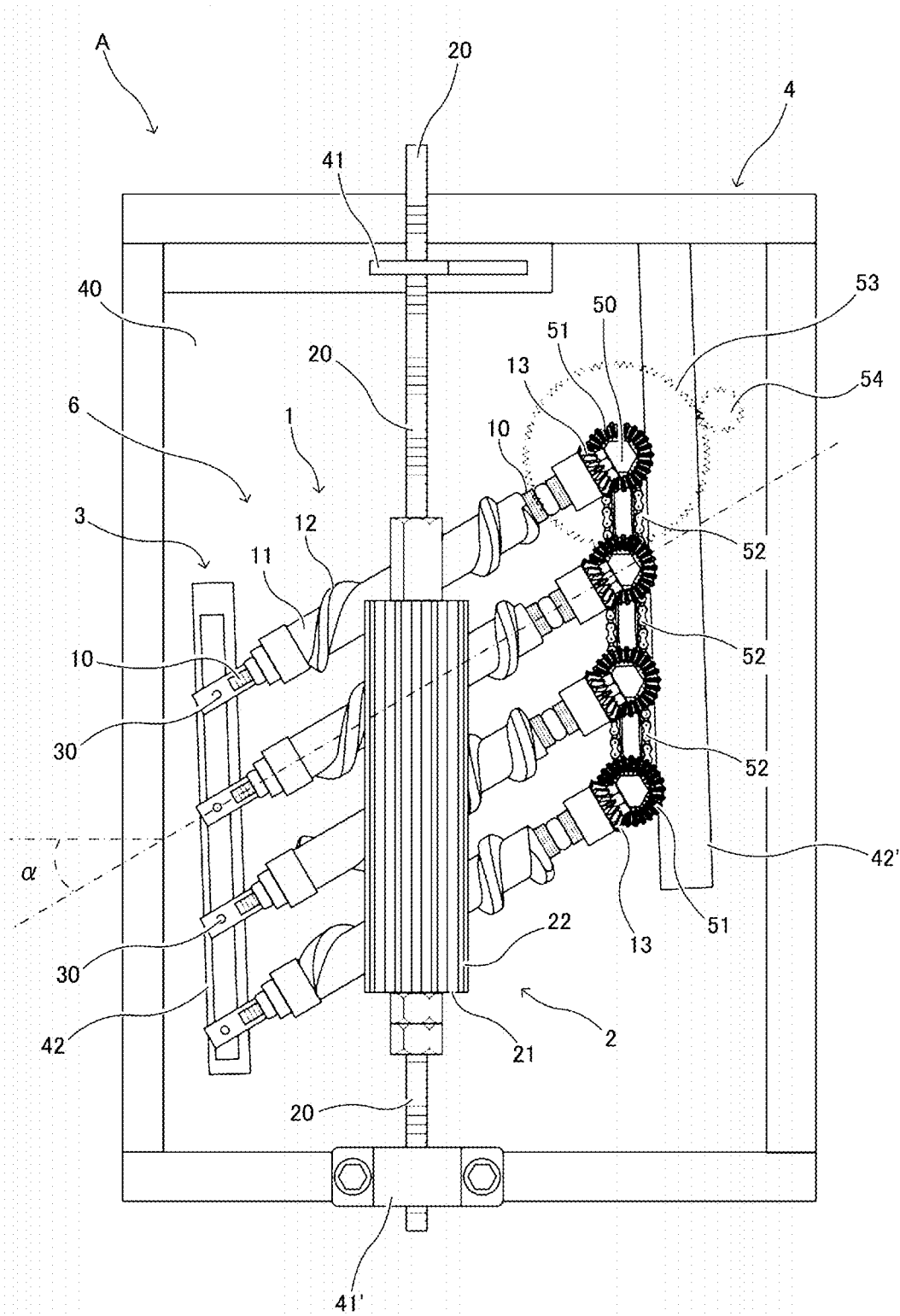
FIG. 1 is a schematic plan view of a continuously variable transmission mechanism according to a first embodiment of the present invention.

Hereinafter, a continuously variable transmission mechanism A according to the first embodiment is described in detail based on drawings. FIG. 1 is a schematic plan view illustrating the basic configuration of the continuously variable transmission mechanism A.

As illustrated in the drawings, the continuously variable transmission mechanism A includes, schematically, (1) a plurality of worm gear bodies 1 (four in this embodiment) on an input side of the continuously variable transmission mechanism A that is formed such that a spiral pitch of the spiral gear tooth 12 having a spiral shape and formed on a peripheral surface of a gear body 11 that forms a gear shaft body is gradually changed;

(2) a wheel gear body 2 on an output side of the continuously variable transmission mechanism A that is formed such that a meshing position is adjustable by allowing the worm body gear 1 and the wheel gear body 2 to mesh with each other at an arbitrary position (meshing position) of the worm gear body 1; and (3) an adjustment operation unit 3 that is connected with the wheel gear body 2, the worm gear body 1, or both of the wheel gear body 2 and the worm gear body 1 in an interlocking manner so as to adjust the meshing position where the wheel gear body 2 and the worm gear body 1 mesh with each other.

The worm gear body 1 is a gear body on an input side of the continuously variable transmission mechanism A that transmits a rotational force to the wheel gear body 2 by meshing with the wheel gear body 2. As illustrated in FIG. 1, the worm gear body 1 includes: an input shaft 10 that is rotatably driven; the circular columnar gear body 11 that is integrally rotated with the input shaft 10; and a gear tooth 12 that is formed on an outer periphery of the gear body 11 spirally along an axial direction.

Figure 2:
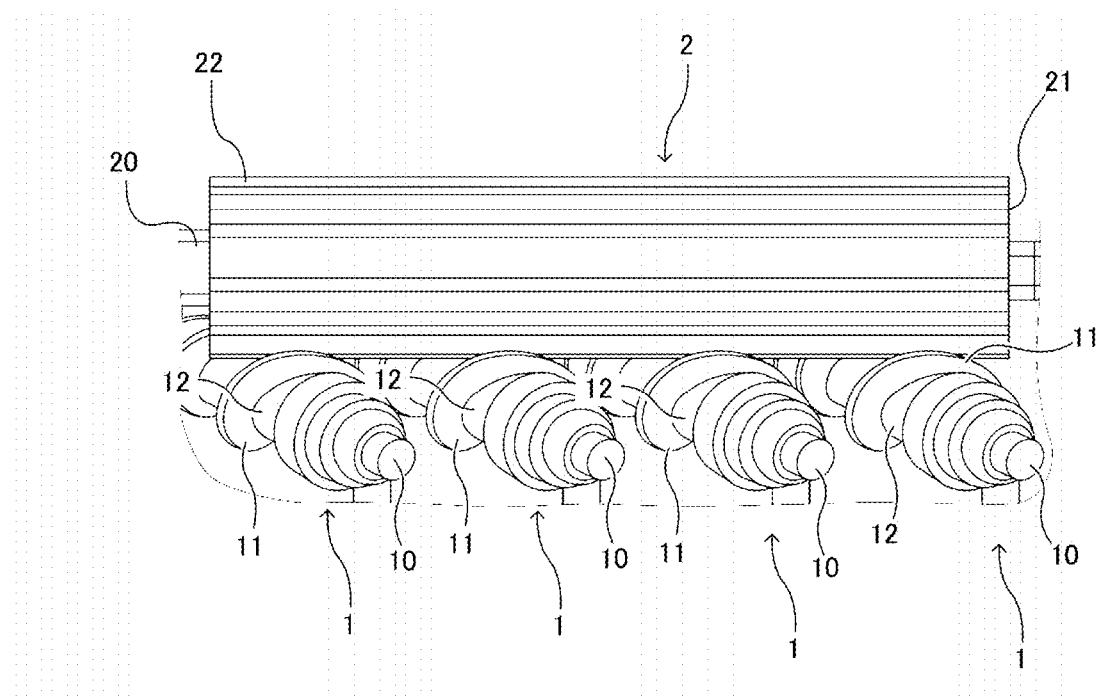
FIG. 2 is a plan view illustrating a meshing relationship between a worm gear body and a wheel gear body used in the continuously variable transmission mechanism according to the first embodiment of the present invention.
Figure 3:
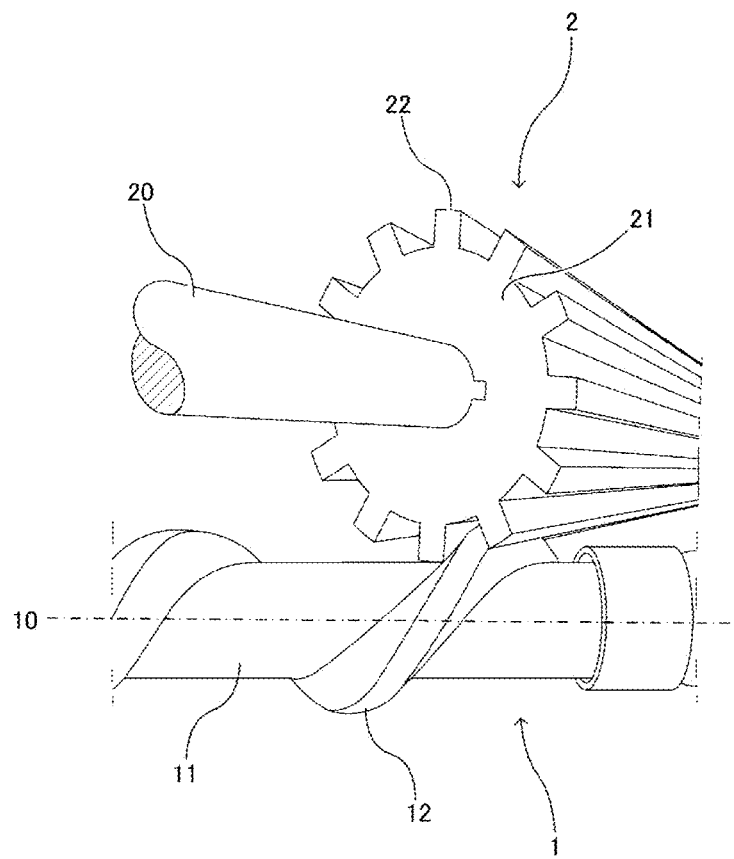
FIG. 3 is a perspective view illustrating a meshing relationship between the worm gear body and the wheel gear body used in the continuously variable transmission mechanism in a mode according to the first embodiment of the present invention.

As illustrated in FIG. 1 to FIG. 3, the gear tooth 12 formed on the worm gear body 1 is one spiral protruding ridge that is continuously formed on an outer peripheral surface of the gear body 11, wherein the gear tooth 12 is formed on the outer peripheral surface of the gear body 11 from the one end toward the other end by gradually increasing or decreasing a pitch of a spiral (a helix). The gear tooth 12 is formed with a gear width and a gear height that enable appropriate meshing with gear teeth 22 of the wheel gear body 2.

A plurality of such worm gear bodies 1 are disposed in parallel to each other in a state that the axial directions of the input shafts 10 are directed in the same direction. Although the number of the worm gear bodies 1 of the continuously variable transmission mechanism A according to the present embodiment is four, the number of the worm gear bodies 1 may be one, two or three, or five or more.

Figure 4:
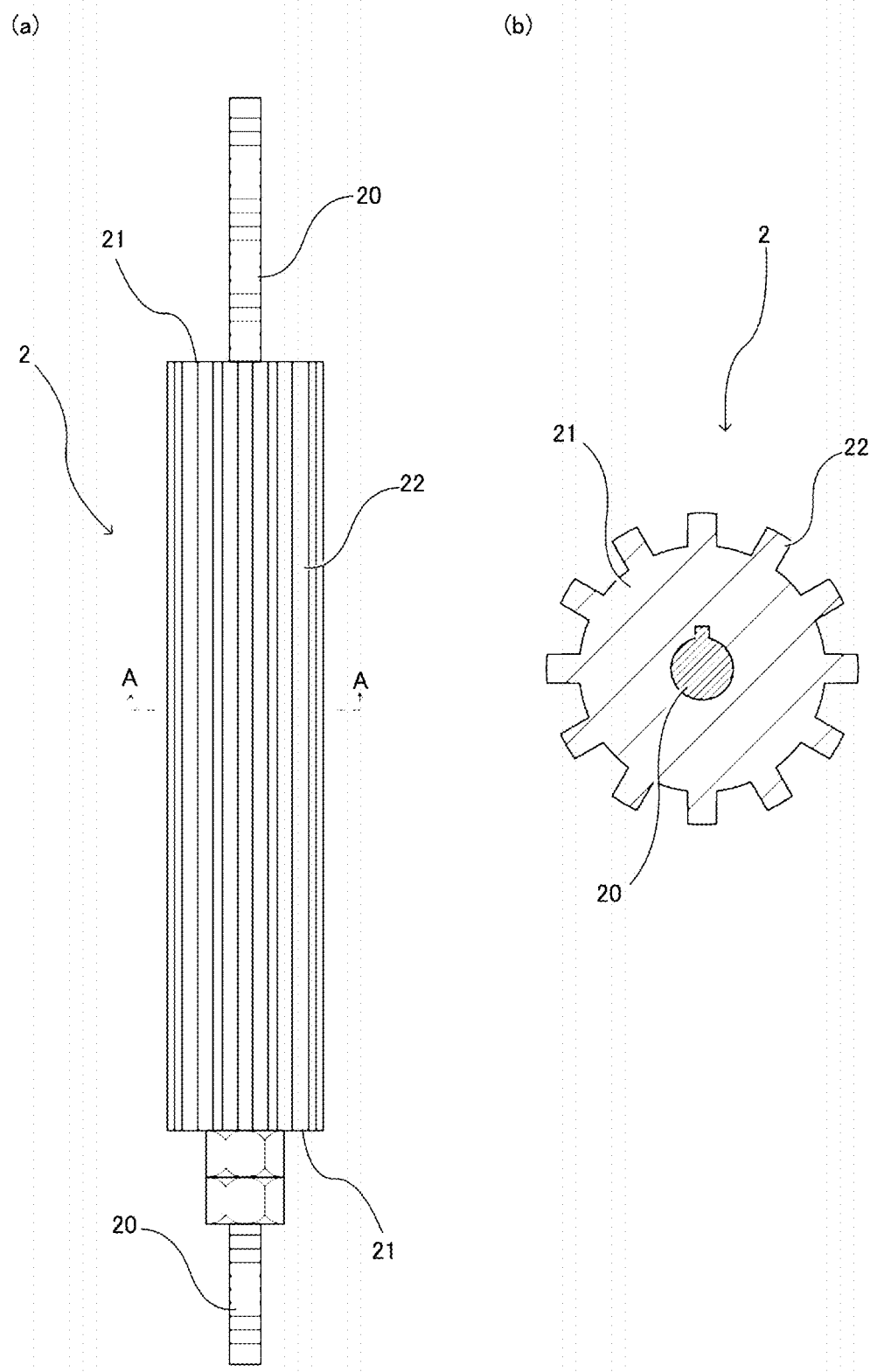

As illustrated in FIG. 3, FIG. 4(*a*) and FIG. 4(*b*), the wheel gear body 2 is formed of a spur gear having a plurality of the gear teeth 22 on an outer peripheral surface where the gear teeth 22 form elongated meshing teeth (cogs) that extend along the axial direction at a fixed interval. The wheel gear body 2 is not limited to a spur gear, and may be formed of a helical gear.

To be more specific, the wheel gear body 2 is a gear body on an output side the continuously variable transmission mechanism that meshes with the worm gear body 1 and is rotated by receiving a rotational force from the worm gear body 1. The wheel gear body 2 is formed of: an output shaft 20; a circular columnar gear body 21 that is integrally rotated with the output shaft 20; and the plurality of the gear teeth 22 that are formed on the outer peripheral surface of the gear body 21.

As illustrated in FIG. 2 or FIG. 3, the gear teeth 22 of the wheel gear body 2 are protruding ridges that are formed on the outer peripheral surface of the gear body 21 in a straight-line shape along an axial direction, and a plurality of the gear teeth 22 are formed at a fixed pitch in a circumferential direction. That is, the wheel gear body 2 corresponds to the worm gear body 1 in a meshing manner by inserting the gear tooth 12 of the worm gear body 1 into gear grooves formed between the gear teeth 22 disposed adjacently to each other.

Further, the wheel gear body 2 is formed in an elongated manner. The length of the wheel gear body 2 allows at least the plurality of the worm gear bodies 1 positioned below the wheel gear body 2 to mesh with the wheel gear body 2. With such a configuration, the continuously variable transmission mechanism A can change the number of the worm gear bodies 1 that mesh with the wheel gear body 2 corresponding to a torque amount necessary on an output shaft side. For example, when a transmission force transmitted to the output shaft side is small, the number of the worm gear bodies 1 may be set to one so that the power of the entire continuously variable transmission mechanism A may be set at a low level.

The adjustment operation unit 3 is configured to, with its manipulation, transmit a gear rotational speed of the worm gear body 1 on an input side to the wheel gear body 2 on the output side at a fixed speed reduction ratio, and change a gear rotational speed in a continuously variable manner or in a stepless manner by adjusting the meshing position between the gear tooth 12 of the worm gear body 1 and the gear teeth 22 of the wheel gear body 2.

In the continuously variable transmission mechanism A having such a configuration, as illustrated in FIG. 1, as viewed in a plan view, four worm gear bodies 1, 1, 1, 1 mesh with the wheel gear body 2 by way of the adjustment operation unit 3 in an intersecting manner by an intersecting angle α (a crossing angle of the axial direction of the input shaft 10 of the worm gear body 1 with respect to the direction orthogonal to the output shaft 20 of the wheel gear body 2).

That is, the worm gear bodies 1, 1, 1, 1 are moved by the adjustment operation unit 3, and can change the intersecting angle of the input shafts 10 with respect to the output shaft 20 of the wheel gear body 2.

As illustrated in FIG. 1, the continuously variable transmission mechanism A includes a frame 4 having a rectangular box shape, and the worm gear bodies 1 and the wheel gear body 2 mounted on the frame 4. The frame 4 is formed of a bottom plate 40, a pair of output side support portions 41, 41' that are raised from the bottom portion 40 in a state where the output side support portions 41, 41' oppositely face the bottom portion 40, and input side support portions 42, 42' that are raised from the bottom portion 40.

The pair of the output side support portions 41, 41' are mounted on left and right sides of the bottom portion 40 in an oppositely facing manner with a fixed interval therebetween, and are rotatably and pivotally support the wheel gear body 2 at a position above the respective worm gear bodies 1, 1, 1, 1. That is, the output side support portions 41, 41' function as bearings that rotatably and pivotally support both end portions of the output shaft 20 of the wheel gear body 2.

An output conversion mechanism (not illustrated in the drawing) that integrally rotates with the wheel gear body 2 is mounted on one end of the output shaft 20 of the wheel gear body 2, and is configured to output a rotational power to be transmitted to the wheel gear body 2 after being subjected to continuously valuable transmission performed by the worm gear body 1 and the adjustment operation unit 3.

Further, inside the frame 4, as illustrated in FIG. 1, four worm gear bodies 1, 1, 1, 1 that have the same shape and the same length and form an input side extend in a left-right direction of the frame 4 in an inclined state as viewed in a plan view. The respective worm gear bodies 1, 1, 1, 1 are arranged at the same intersecting angle α (60° in FIG. 1) with respect to the wheel gear body 2 in a state where input shafts 10, 10, 10, 10 of the worm gear bodies 1, 1, 1, 1 are arranged parallel to each other in a spaced apart manner at a fixed interval.

The respective worm gear bodies 1, 1, 1, 1 are pivotally and rotatably supported between the pair of elongated input side support portion 41, 42' arranged inside the frame 4, and are disposed in a horizontally swingable manner inside the frame 4. To describe in more detail, each worm gear body 1 is configured such that one end portion of an input shafts 10 is horizontally and rotatably and pivotally supported by a rotary shaft 30 mounted on an input side support portion 42, and the other end portion of the input shafts 10 is horizontally rotatably and pivotally supported by a rotary shaft 50 formed on the other input side support portion 42', and the respective worm gear body are horizontally made to swing while maintaining a parallel state between the input shafts 10, and are horizontally swingable while maintaining a parallel state to each other inside the frame 4.

Right end portions of the input shafts 10, 10, 10, 10 of the respective worm gear bodies 1, 1, 1, 1 are pivotally connected to rotary shafts 50 mounted on an input side support portions 42' on a right side by way of a pair of bevel gears 13, 51 (see FIG. 6a to FIG. 6c)

Further, left end portions of the input shafts 10, 10, 10, 10 of the respective worm gear bodies 1, 1, 1, 1 are pivotally connected to an input side support portion 42 on a left side by way of rotary shafts 30 (see FIG. 1)

With such a configuration, the continuously valuable transmission mechanism A forms a worm gear body support frame 6 that is constituted of the input side support portion 42' on the right side, the input side support portion 42 on the left side, the worm gear body 1 that is disposed on the uppermost stage, and the worm gear body 1 that is disposed on the lowermost stage. That is, the worm gear body support frame 6 forms a parallelogram as viewed in a plan view that is capable of changing its shape (see FIG. 1).

Sprocket wheels (not illustrated in the drawing) are mounted on the respective rotary shafts 50 disposed on the input side support portion 42' on the right side. The respective sprocket wheels are connected to each other in an interlocking manner in tandem by a plurality of respective endless chains 52, 52, 52.

A speed-reduction-use large gear 53 is fixedly mounted on the rotary shaft 50 on the uppermost stage, and the speed-reduction-use large gear 53 meshes with a speed-reduction-use small gear 54. The speed-reduction-use small gear 54 is connected to a worm gear body drive motor (not illustrated in the drawing) that constitutes a drive unit.

That is, when the worm gear body drive motor that constitutes the drive unit is driven, the speed-reduction-use small gear 54 and the speed reduction-use large gear 53 are rotated, and the respective rotary shafts 50, 50, 50, 50 are rotatably driven by way of the endless chains 52, 52, 52. The bevel gears 51, 13 are rotated along with rotational driving of the rotary shaft 50 so that four worm gear bodies 1, 1, 1, 1 are synchronously rotated about their axes.

The adjustment manipulation unit 3 is a manipulation unit that can adjust the intersecting angle α of the worm gear bodies 1 with respect to the wheel gear body 2. This adjustment manipulation unit 3 is described with reference to FIG. 1 and FIG. 6(a) to FIG. 6(c).

Figure 6:
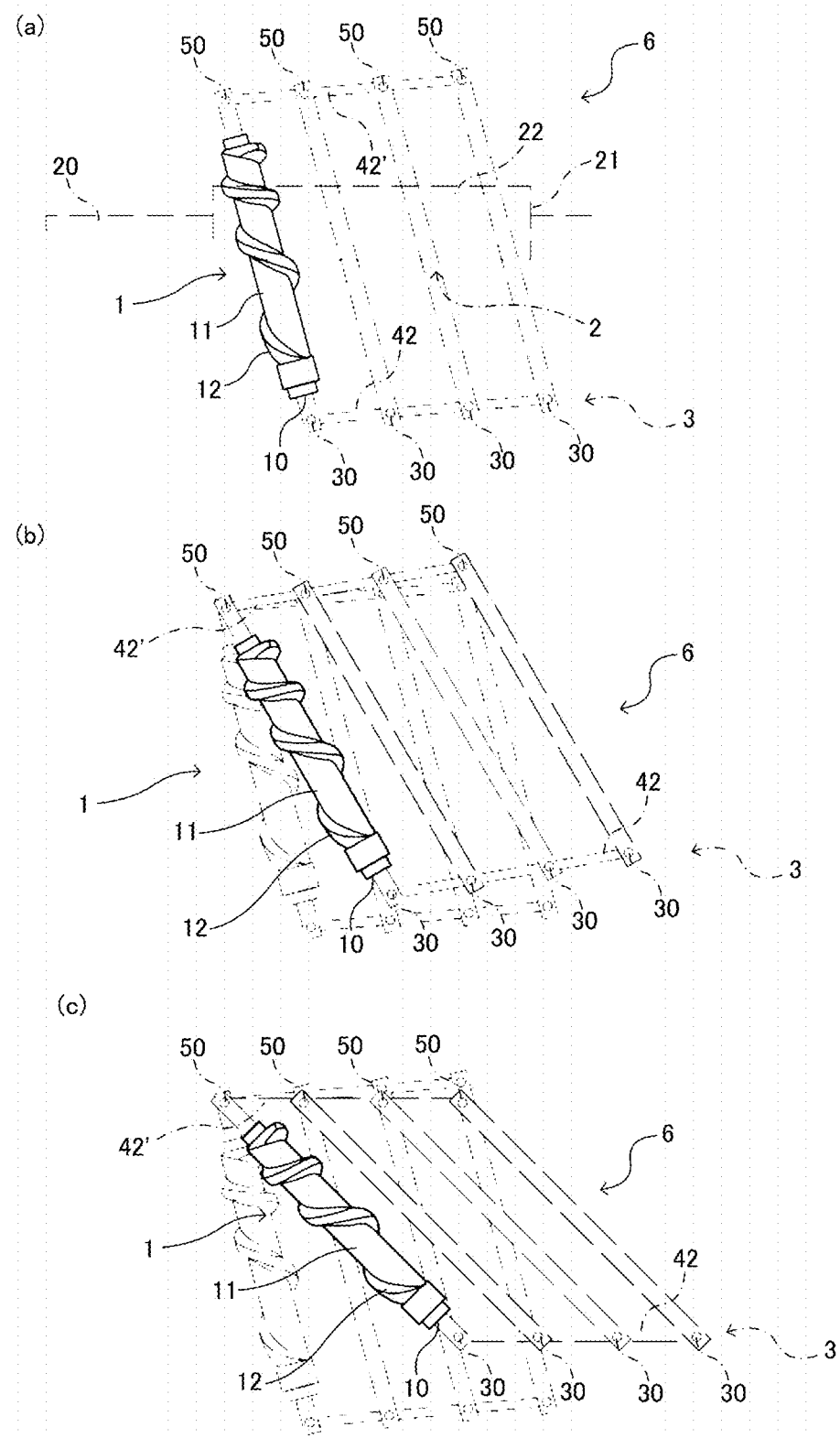
Figure 7:
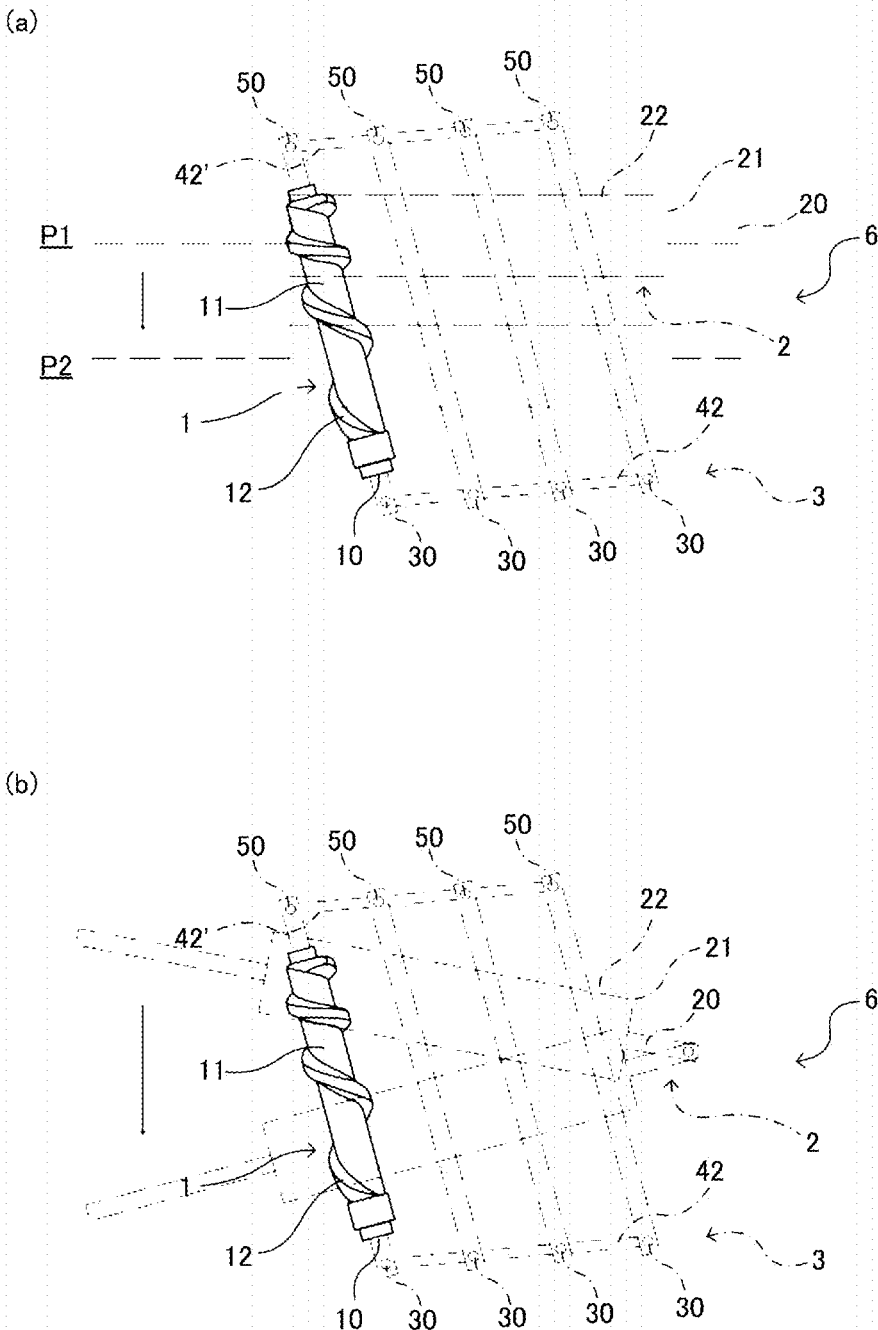

With respect to the adjustment, the manipulation unit 3, by operating a drive mechanism that adjusts the adjustment manipulation unit 3, as illustrated in FIG. 6 (a) to FIG. 6(c), the intersecting angle α of the worm gear bodies 1 with respect to the wheel gear body 2 can be changed by changing the configuration of the worm gear body support frame 6.

As described previously, in a case where only the worm gear body 1 on the input side where the spiral pitch of the helical screw shaft formed on an outer peripheral surface of the gear shaft body is gradually changed is adopted, as illustrated in FIG. 1, due to a change in the spiral pitch of the worm gear body 1, a screw angle of the screw gear changes. Accordingly, with such a configuration, it is difficult to ensure favorable meshing between the gear tooth 12 of the worm gear body 1 and the gear teeth 22 of the wheel gear body 2.

In view of the above circumstance, in the continuously valuable transmission mechanism of this embodiment, the meshing positions between the wheel gear body 2 and the worm gear bodies 1 are adjusted by changing the intersecting angles α of the worm gear bodies 1 with respect to the wheel gear body 2 using the adjustment manipulation unit 3.

For example, the adjustment manipulation unit 3 can be easily formed by connecting a distal end of an extendable and retractable cylinder not illustrated in the drawing to an intermediate portion of the input side support portion 42 on the left side. That is, the adjustment manipulation unit 3 is constituted of: the extendable and retractable cylinder; and the input side support portion 42 on the left side that moves due to extending or retracting operation of the extendable and retractable cylinder.

In other words, the respective worm gear bodies 1 are rotatably displaced in a horizontal direction along with an extending or retracting operation of the extendable and retractable cylinder of the adjustment manipulation unit 3, about the rotary shafts 50 of the input side support portion 42' on the right side that rotatably supports the other end portions of the input shafts 10 together with the input side support portion 42 on the left side that rotatably supports one end portions of the input shafts 10.

That is, the input shaft 10 of the worm gear body 1 is configured such that the other end portion of the input shaft 10 is connected to the drive unit thus forming a fixed end portion to which a rotational drive force is transmitted and the input shaft 10 forms a movable shaft that forms a free end portion that horizontally moves one end portion about the rotary shaft 50 at the other end portion.

With such a configuration, based on or corresponding to the meshing position, the direction of a tooth trace (the direction orthogonal to a cross section) of the gear tooth 12 of the worm gear body 1 and the direction of a tooth trace (the direction orthogonal to a cross section) of the gear tooth 22 of the wheel gear body 2 are aligned with each other thus ensuring favorable meshing between the gear tooth 12 of the worm gear body 1 and the gear tooth 22 of the wheel gear body 2.

That is, in FIG. 1, in the embodiment, by manipulating the extendable and retractable cylinder that forms the adjustment manipulation unit 3, the configuration of the worm gear body support frame 6 can be changed to any configuration illustrated in FIG. 6(a) to FIG. 6(c) using the rotary shaft 50 that pivotally supports the right end of the input shaft 10 of the worm gear body 1 on the uppermost stage in FIG. 1 as the center of rotation.

By changing the configuration of the worm gear body support frame 6, when the extendable and retractable cylinder is retracted, the worm gear body 1 is disposed at the position indicated by a solid line while the worm gear body support frame 6 has a parallelogram illustrated in FIG. 6(a).

At this position, at a pitch portion having a screw angle of 15 degrees that is formed at one end of each worm gear body 1, the gear tooth 12 of the worm gear body 1 and the gear tooth 22 of the wheel gear body 2 mesh with each other at an inclination angle of 15 degrees.

Next, when the extendable and retractable cylinder is extended to the intermediate position, the worm gear bodies 1 are moved to the position indicated by a solid line. Accordingly, the worm gear body support frame 6 changes its configuration from the configuration illustrated in FIG.

6(*a*) to the configuration on a right side in FIG. 6(*b*) by rotating in a counterclockwise direction using the rotary axis 50 as the center of rotation.

At this position, at a pitch portion having a screw angle of 30 degrees formed at one end of each worm gear body 1, the gear tooth 12 of the worm gear body 1 and the gear tooth 22 of the wheel gear body 2 engage with each other at an inclination angle of 30 degrees.

Further, when the extendable and retractable cylinder is extended to a maximum length, the worm gear body 1 moves to the position indicated by a solid line. Accordingly, the worm gear body support frame 6 changes its configuration from the configuration illustrated in FIG. 6(*a*) to the configuration on a right side of FIG. 6(*c*) by rotating in a counterclockwise direction using the rotary shaft 50 as the center of the rotation.

At this position, at a pitch portion having a screw angle of 60 degrees formed at one end of each worm gear body 1, the gear tooth 12 of the worm gear body 1 and the gear tooth 22 of the wheel gear body 2 engage with each other at an inclination angle of 60 degrees.

The manner of operation and advantageous effect of the continuous valuable transmission mechanism A having the above-mentioned configuration are described. In the continuously valuable transmission mechanism A, when a worm gear body driving motor is driven, the worm gear bodies 1 on an input side are rotated. Due to meshing between the worm gear bodies 1 on the input side and the wheel gear body 2 on the output side, a rotational force generated by the worm gear body drive motor can be transmitted to the wheel gear body and a load connected to an output side of the wheel gear body 2.

Further, in the continuously valuable transmission mechanism A, by extending or retracting the extending and retracting cylinder that forms the adjustment manipulation unit 3, the parallelogram of the worm gear body support frame 6 changes so that the intersecting angle α of the worm gear bodies 1 with respect to the wheel gear body 2 can be changed using the rotational axis 50 at the right end of the worm gear body 1 on the uppermost stage as the center of rotation.

As illustrated in FIG. 6(*a*), by positionally aligning the pitch portion having a screw angle of 15 degrees that is formed on one end of each worm gear body 1 with the wheel gear body 2, the gear tooth 12 of the worm gear body 1 and the gear tooth 22 of the wheel gear body 2 can be made to mesh with each other at an inclination angle of 15 degrees.

On the other hand, when the extendable and retractable cylinder is extended to the intermediate position, the worm gear body support frame 6 is moved from the position illustrated in FIG. 6(*a*) to the position illustrated in FIG. 6(*b*) so that the parallelogram shape of the worm gear body support frame 6 changes. As a result, the gear tooth 12 at the pitch portion having the screw angle of 30 degrees that is formed on the other end of each worm gear body 1 meshes with the gear tooth 22 of the wheel gear body 2 at an angle of 30 degrees.

Further, when the extendable and retractable cylinder is extended to a maximum, the worm gear body support frame 6 is moved from the position illustrated in FIG. 6(*b*) to the position illustrated in FIG. 6(*c*) so that the parallelogram shape further changes.

As a result, the gear tooth 12 at the pitch portion having the screw angle of 60 degrees formed on the other end of each worm gear body 1 meshes with the gear tooth 22 of the wheel gear body 2 at an angle of 60 degrees.

Figure 5:
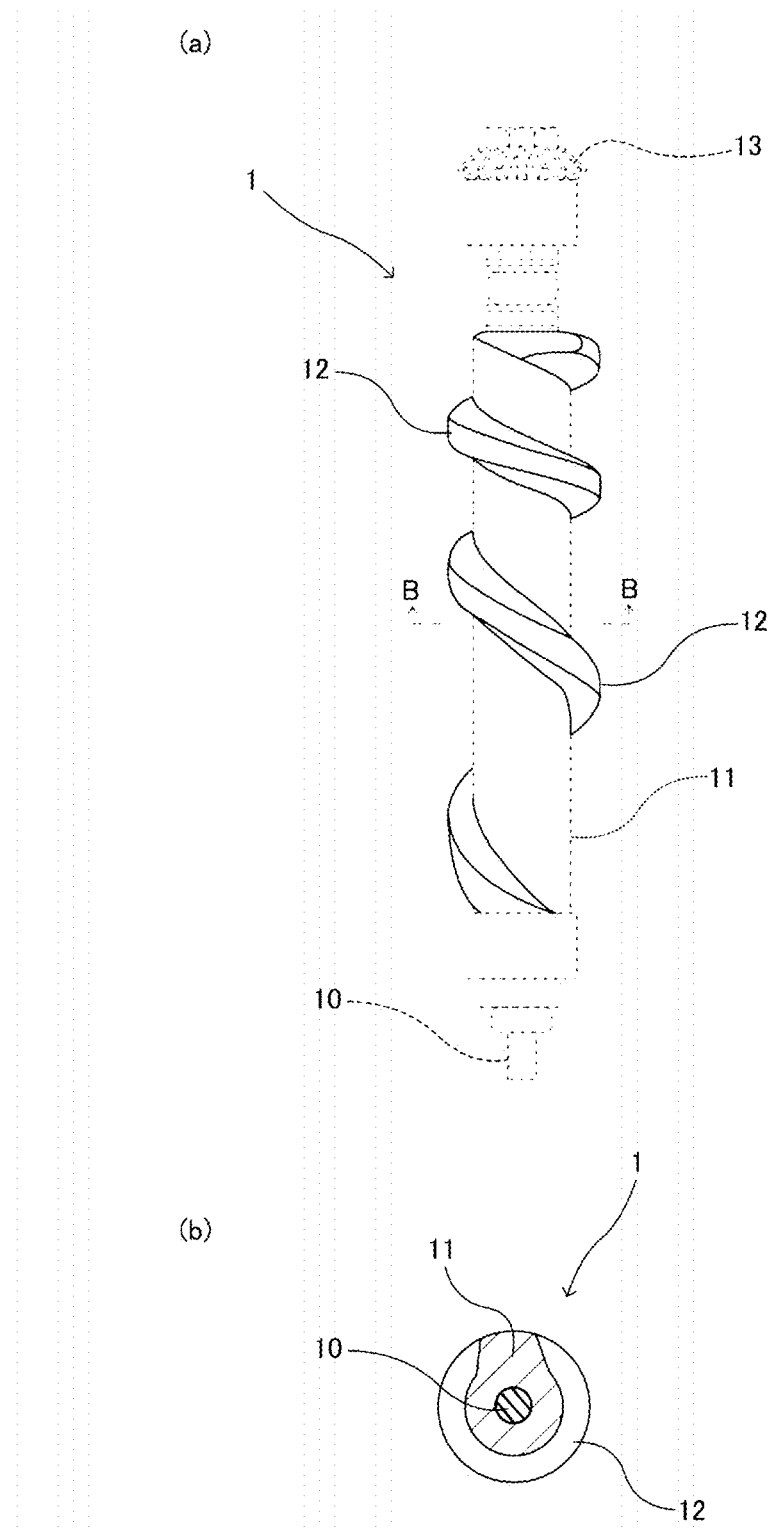

Further, the continuously valuable transmission mechanism A changes, as illustrated in FIG. 5(*a*) and FIG. 5(*b*), a spiral pitch of the spiral gear tooth 12 formed on the peripheral surface of a gear shaft body of the worm gear body 1 between 15 degrees and 45 degrees in a stepless (continuous) manner.

Accordingly, the continuously valuable transmission mechanism A described in this embodiment can easily change a speed reduction ratio between the worm gear body 1 and the wheel gear body 2 by being configured such that the gear tooth 12 having a spiral shape is continuously changed to different angles from one end portion to the other end portion of the worm gear body 1.

That is, the continuously variable transmission mechanism A is configured such that the shape of the spiral gear tooth 12 is continuously changed such that the spiral pitch is increased from one end portion to the other end portion of the worm gear body 1. Accordingly, the continuously variable transmission mechanism A change a speed in a continuously variable manner. Further, with such a configuration, it is possible to ensure the reliable meshing between the gear tooth 12 of the worm gear body 1 and the gear teeth 22 of the wheel gear body 2 over the entire length of the worm gear body 1.

Second Embodiment

Next, a continuously valuable transmission mechanism A2 according to the second embodiment is described with reference to FIG. 10. In the continuously valuable transmission mechanism A described in the first embodiment, in adjusting the meshing position between four worm gear bodies 1 on the input side and the wheel gear body 2 on the output side, four worm gear bodies 1 in the input side are translationally moved, and the wheel gear body 2 is held at the fixed position.

To the contrary, in the continuously valuable transmission mechanism A2 according to this embodiment, in adjusting the meshing position between four worm gear bodies 1 on the input side and the wheel gear body 2 on the output side, the configuration is adopted where the worm gear bodies 1 on the input side are fixed, and the wheel gear body 2 on the output side is translationally moved in the lateral direction.

The basic configuration of the continuously valuable transmission mechanism A2 according to this embodiment is equal to the basic configuration of the continuously valuable transmission mechanism A. Accordingly, only the constitutional elements that make the continuously valuable transmission mechanism A2 differ from the continuously valuable transmission mechanism A are described, and the same symbols are given to the identical constitutional elements, and the detail of these constitutional elements is omitted.

Figure 10:
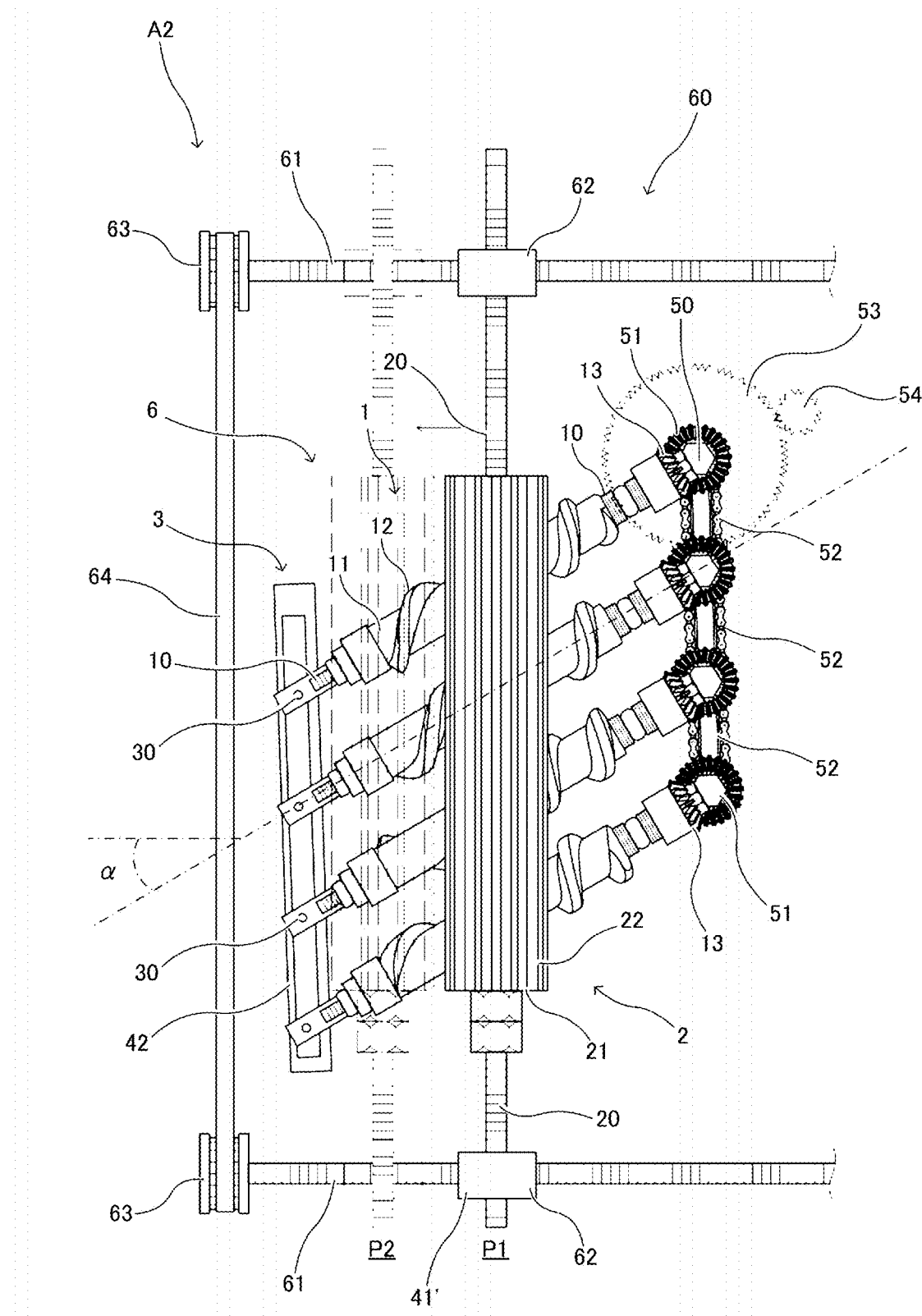
FIG. 10 is a schematic plan view of a continuously variable transmission mechanism according to a second embodiment of the present invention.

As illustrated in FIG. 10, with the use of a worm wheel translational movement device 60, a wheel gear body 2 is configured to be movable translationally between a meshing position P1 (a position indicated by a solid line) where gear tooth 12 of a worm gear bodies 1 and gear teeth 22 of a wheel gear body 2 mesh with each other at an angle of 15 degrees and a meshing position P2 (a position indicated by a broken line) where the gear tooth 12 of each of the worm gear bodies 1 and the gear teeth 22 of the wheel gear body 2 mesh with each other at an angle of 60 degrees.

To be more specific, the worm wheel translational movement device 60 includes:

(1) a pair of transfer screw shafts 61, 61' that are disposed in an extending state in a direction (lateral direction on the drawing) orthogonal to an axis of the wheel gear body 2 at both ends of the wheel gear body 2 that extends in the longitudinal direction on the drawing;

(2) a pair of moving blocks 62, 62' that rotatably and pivotally supports both ends of an output shaft 20 on which a wheel gear body 2 is fixedly mounted, and has threadedly mounting portions that are threadedly mounted on the transfer screw shafts 61, 61'; and (3) sprocket wheels 63, 63' that are fixed to corresponding one ends of the transfer screw shafts 61, 61', and a wheel gear body drive motor (not illustrated in the drawing) that is connected to one end of the transfer screw shaft 61 and functions as an adjustment manipulation unit; and (4) a synchronous endless chain 64 that is extended between the sprocket wheels 63, 63' parallel to an axis of the output shaft 20 of the wheel gear body 2 and is wound around the sprocket wheels 63, 63'.

With the above-mentioned configuration, when the wheel gear body drive motor that constitutes a part of the adjustment manipulation unit is driven, the transfer screw shafts 61, 61' rotates synchronously by the synchronous endless chain 64.

Then, with such a rotation of the transfer screw shafts 61, 61', the moving blocks 62, 62' that are threadedly engaged with the transfer screw shafts 61, 61', and the wheel gear body 2 that is disposed in an extending manner between the moving blocks 62, 62' perform translational movement.

That is, the wheel gear body 2 can perform the translational movement between the meshing position P1 and the meshing position P2.

With such an operation, the continuously valuable transmission mechanism A2 performs the translational movement of the wheel gear body 2 and adjusts the meshing position between the wheel gear body 2 and the worm gear body 1.

To be more specific, the direction (the direction orthogonal to the cross section) of the tooth trace of the gear tooth 12 of the worm gear body 1 and the direction (the direction orthogonal to the cross section) of the tooth trace of the gear tooth 22 of the wheel gear body 2 are aligned based on the meshing position thus adjusting the meshing position between the gear tooth 12 of the worm gear body 1 and the gear tooth 22 of the wheel gear body 2. In accordance with such adjustment, a gear rotational speed can be changed continuously (in a stepless manner).

Third Embodiment

Next, a continuously valuable transmission mechanism A3 according to the above-mentioned third embodiment is described with reference to FIG. 11. In the above-mentioned continuously valuable transmission mechanism A, in adjusting the meshing position between four worm gear bodies 1 on the input side and the wheel gear body 2 on the output side, using the rotary shaft 50 (see FIG. 6(a)) that pivotally supports the right end of the worm gear body 1 at the uppermost stage in FIG. 1 as the center of rotation, the worm gear body support frame 6 is deformed thus making four worm gear bodies 1 on the input side perform the translational movement. On the other hand, the wheel gear body 2 is held at the fixed position.

Figure 11:
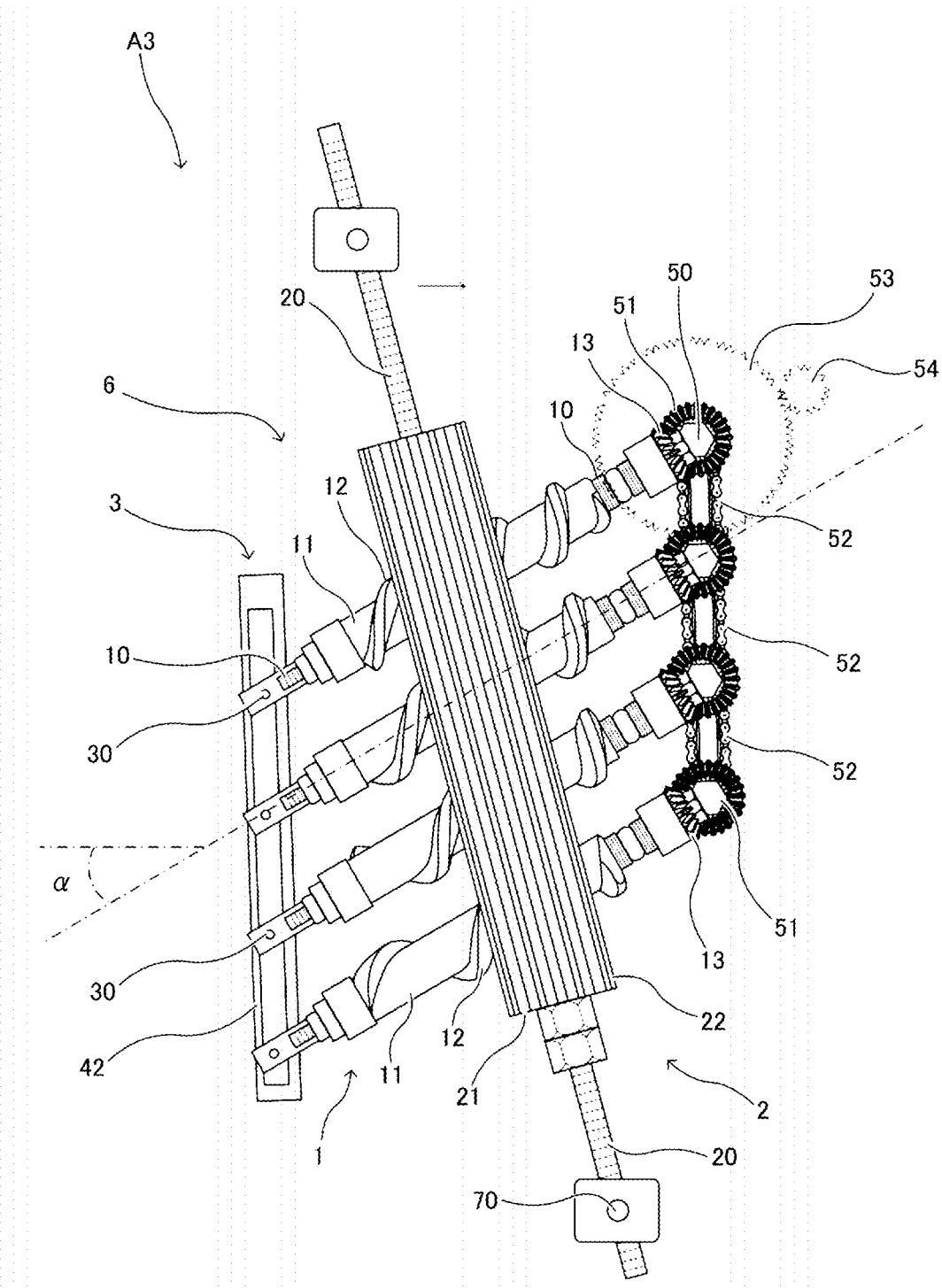
FIG. 11 is a schematic plan view of a continuously variable transmission mechanism according to a third embodiment of the present invention.

To the contrary, in the continuously valuable transmission mechanism A3 according to this embodiment is characterized in that, as illustrated in FIG. 11, one end portion of an output shaft 20 of a wheel gear body 2 is rotatably and pivotally supported by a pivoting shaft 70 that is mounted upright on a frame 4, and the other end portion of the output shaft 20 of the wheel gear body 2 is made to perform the translational movement. According to the above-mentioned configuration, the continuously variable transmission mechanism A3 adjusts the meshing position of the wheel gear body 2 with the worm gear body 1.

To be more specific, the direction (the direction orthogonal to the cross section) of the tooth trace of the gear tooth 12 of the worm gear body 1 and the direction (the direction orthogonal to the cross section) of the tooth trace of the gear tooth 22 of the wheel gear body 2 are aligned with each other based on the meshing position.

Accordingly, it is possible to ensure the favorable meshing between the gear tooth 12 of the worm gear body 1 and the gear tooth 22 of the wheel gear body 2.

Although the continuously valuable transmission mechanisms A1 to A3 according to the first to third embodiments have been described heretofore, these continuously valuable transmission mechanisms may have the following configuration.

Figure 8:
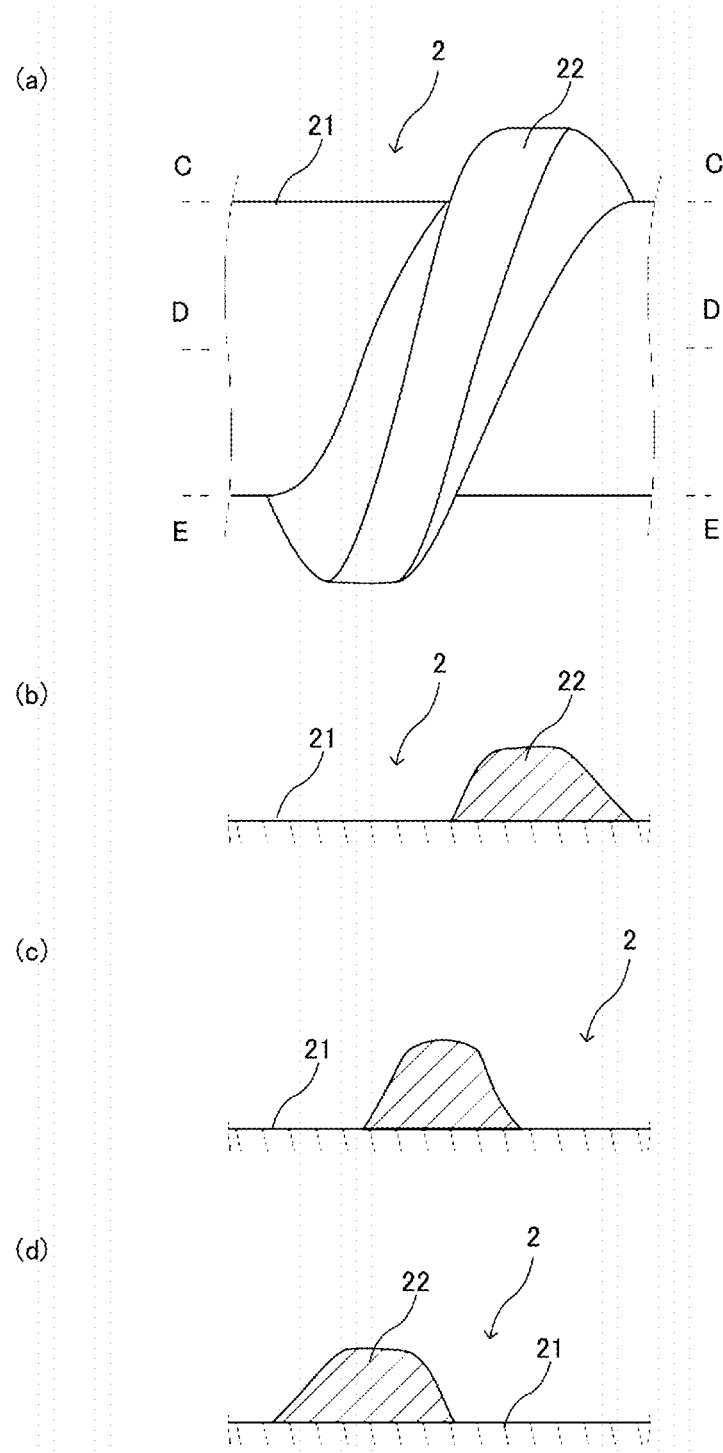
Figure 9:
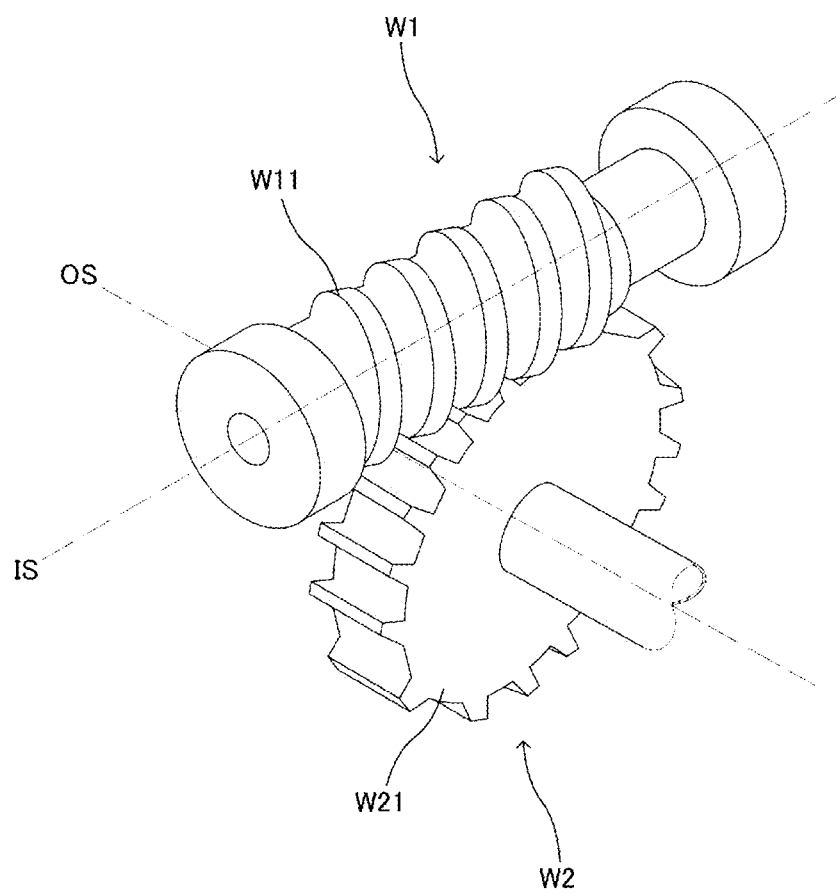
FIG. 9 is a perspective view illustrating a conventional worm speed reduction mechanism.

As illustrated in FIG. 8, within a predetermined pitch, by taking into account an actual meshing state, a cross section C-C, a cross section D-D, and a cross section E-E in FIG. 8(a) may be formed in an optimum shape to obtain the smooth meshing. (FIG. 8(b), FIG. 8(c), FIG. 8(d)).

Fourth Embodiment

Figure 12:
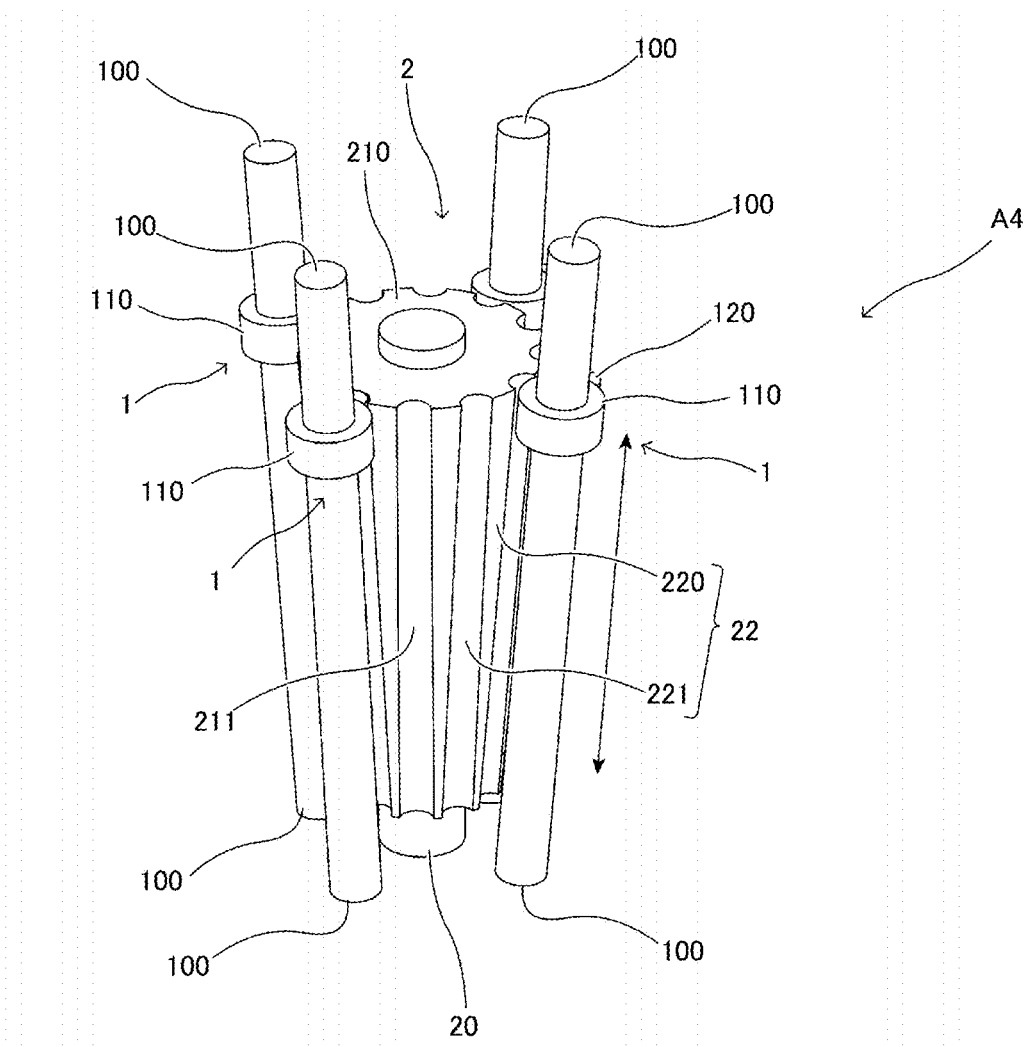
FIG. 12 is a schematic perspective view of a continuously variable transmission mechanism according to a fourth embodiment of the present invention.

Next, a continuously variable transmission mechanism A4 according to the fourth embodiment is described with reference to FIG. 12 to FIG. 15. The continuously variable transmission mechanism A4 of this fourth embodiment, as illustrated in FIG. 12, has substantially the same configuration with the continuously variable transmission mechanism A of the above-mentioned first embodiment with respect to a point that the continuously variable transmission mechanism A4 of this fourth embodiment includes: an elongated rode-shaped wheel gear body 2 having a peripheral surface on which gear teeth 22 are formed; and a worm gear body 1 having a gear tooth 12 that meshes with the gear teeth 22 formed on the peripheral surface of the wheel gear body 2.

The continuously variable transmission mechanism A4 of this embodiment differs from the continuously variable transmission mechanism A of the above-mentioned embodiment with respect to the follow points. That is, the continuously variable transmission mechanism A4 of this embodiment is configured such that (1) The wheel gear body 2 is formed in a tapered shape where a diameter of a gear body 210 is gradually increased or decreased from one end to the other end of the gear body 210.

(2) The worm gear bodies 1,1,1,1 are each configured to allow a gear tooth 12 formed on a peripheral surface thereof to mesh with the gear teeth 22 formed on the peripheral surface of the wheel gear body 2, and is movable along the peripheral surface of the wheel gear body 2.

(3) A rotation of the worm gear bodies 1,1,1,1 is transmitted to the wheel gear body 2 in a state where a rotational speed of the worm gear bodies 1,1,1,1 is changed in a continuously variable manner depending on the gear position on the peripheral surface of the wheel gear body 2.

Figure 13:
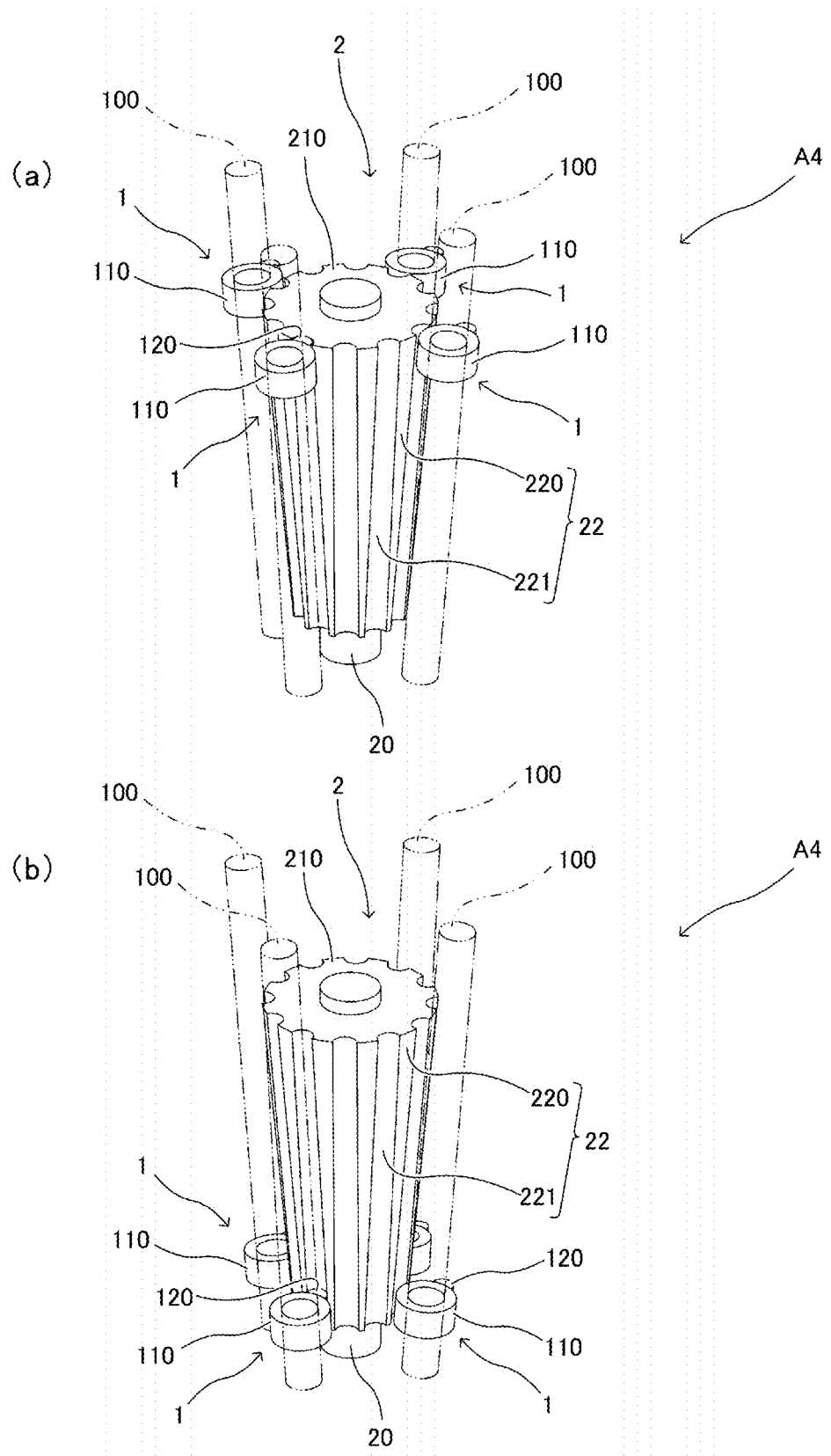
FIG. 13 is a schematic perspective view of the continuously variable transmission mechanism according to the fourth embodiment of the present invention.

As illustrated in FIG. 12 to FIG. 13(b), the wheel gear body 2 is constituted of: a gear body 210 having a fine elongated frustoconical shape or a conical shape that is integrally fitted on and fixed to an output shaft 20; and gear teeth 22 that function as cogs formed on the outer periphery of the gear body 210.

The output shaft 20 is connected to a drive shaft (not illustrated in the drawing) of a rotary drive device at a predetermined position that becomes a speed change target, and is pivotally supported by a predetermined bearing (not illustrated in the drawing) mounted on a platform. The gear body 210 has a longitudinal direction (axial direction) thereof that extends along an axial direction of the output shaft 20. As viewed in a cross-sectional view, the longitudinal direction (axial direction) of the gear body 210 extends along axial direction of the output shaft 20, and the center of the output shaft 20 is coaxial with the center of an approximately circular shape as viewed in cross section, and the gear body 210 is fixed to the output shaft 20.

As illustrated in FIG. 12 to FIG. 13(b), an outer diameter of the gear body 210 is gradually increased or decreased from one end side to the other end side in the longitudinal direction (axial direction), and hence, an outer peripheral surface 211 of the gear body 210 is formed in a tapered surface inclined along the longitudinal direction (axial direction).

The plurality of gear teeth 22 are formed on the outer peripheral surface 211 of the gear body 210 at a fixed pitch in the circumferential direction, and forms tooth traces along the longitudinal direction (axial direction) of the gear body 210. To be more specific, the gear teeth 22 are formed of a plurality of gear ridge portions 220 and a plurality of gear valley portions 221 that are alternately formed on the outer peripheral surface 211 of the gear body 210 in the circumferential direction.

The gear ridge portion 220 is gradually increased or decreased from one end side to the other end side so as to conform with the tapered shape of the gear body 210. That is, as illustrated in FIG. 12 to FIG. 13(b), the shape of the tooth trace formed of a top surface of the gear ridge portion 220 is formed into a fine elongated approximately trapezoidal shape that is gradually increased or decreased in the axial direction of the gear body 210.

The gear valley portions 221 have the same pitch length as the teeth grooves, and the gear valley portion 221 extends in the axial direction of the gear body 210 and, at the same time, a groove having a semicircular shape as viewed in cross section is formed between the gear ridge portions 220, 220 disposed adjacently to each other. That is, as illustrated in FIG. 12 to FIG. 13(b), the groove trace shape of the gear valley portion 221 is formed into a fine elongated approximately rectangular shape along the axial direction of the gear body 210.

Around an outer periphery of the wheel gear body 2 on an output side described above, a plurality of worm gear bodies 1, 1, 1, 1 on an input side are rotatably disposed such that the gear teeth 120 formed on the peripheral surfaces of these worm gear bodies 1, 1, 1, 1 mesh with the gear teeth 22 of the wheel gear body 2. The four worm gear bodies 1, 1, 1, 1 are arranged in a crossing symmetrical shape with respect to the output shaft 20 as viewed in an axial direction of the wheel gear body 2.

The worm gear body 1 is constituted of: a gear body 110 that is integrally rotated with an input shaft 100 that is connected to a predetermined drive source and is configured to be movable along the input shaft 100 while integrally rotated with the input shaft 100; and a gear tooth 120 that is formed on an outer peripheral surface of the gear body 110 in a radially and outwardly protruding manner.

With respect to the plurality of input shafts 100, 100, 100, 100 as illustrated in FIG. 12 to FIG. 13(b), four input shafts are arranged at a fixed interval around an outer periphery of the wheel gear body 2 along the inclination of the tapered outer peripheral surface 211 of the wheel gear body 2.

To be more specific, the respective input shaft 100, 100, 100, 100 are inclined with respect to the output shaft 20 of the wheel gear body 2, and at the same time, are arranged around the outer periphery of the output shaft 20 such that the respective input shafts 100, 100, 100, 100 have the same intersecting point at a predetermined position on an extension of the output shaft 20. The respective input shafts 100, 100, 100, 100 are formed so as to synchronously rotate in the same rotational direction and with the same rotational amount.

The gear body 110 is configured such that the gear body 110 has a short cylindrical shape, the gear body 110 is fitted on the input shaft 100 by inserting the input shaft 100 into a cylindrical hole, the gear body 110 is movable with respect to the axial direction of the input shaft, and the gear body 110 is fixed to the input shaft 100 with respect to the circumferential direction so that the movement of the gear body 110 in the circumferential direction is restricted.

As the fitting engagement structure between the worm gear body 1 and the input shaft 100, for example, it is possible to adopt a spline fitting engagement structure where the cylindrical hole of the gear body 110 of the worm gear body 1 and an outer peripheral surface of the input shaft 100 engage with each other by female-male fitting engagement.

To be more specific, the fitting engagement structure between the worm gear body 1 and the input shaft 100 is constituted by forming a male-side spline fitting engagement portion that extends in the axial direction on the outer peripheral surface of the input shaft 100, and by forming a female side spline fitting engagement manner that corresponds to the male side spline fitting engagement portion of the input shaft 100 on an inner peripheral surface of the cylindrical hole of the gear body 110.

Further, the plurality of worm gear bodies 1, 1, 1, 1 are respectively move synchronously and parallel to each other by an adjustment manipulation portion (not illustrated in the drawing) so as to set the positions of these worm gear bodies 1, 1, 1, 1 in the longitudinal direction (axial direction) of the outer peripheral surface 211 of the wheel gear body 2 at the same position (the phases (the levels) with respect to the axial direction of the input shaft 100 being set equal). That is, the respective worm gear bodies 1, 1, 1, 1 are moved along the input shaft 100 in a synchronized manner with each other by the adjustment use manipulation portion 3 so as to be constantly positioned on an imaginary radial cross section of the wheel gear body 2.

The configuration where the respective worm gear bodies 1, 1, 1, 1 are moved by such an adjustment use manipulation portion 3 may be the configuration where the gear body 110 is moved along the input shaft 100 or may be the configuration where the gear body 110 that is integrally formed with the input shaft 100 is moved along the axial direction with the input shaft 100.

The gear tooth 120 is formed as a single protruding portion that protrudes radially outward of the input shaft 10. To be more specific, the gear tooth 120 is formed in a semicircular shape as viewed in cross section that engages with the gear valley portion 221 of the gear tooth so as to have a shape that makes the gear tooth 120 mesh or separate from the gear tooth 22 of the wheel gear body 2.

Particularly, in the continuously valuable mechanism A4 of this embodiment is configured such that at least one worm gear body 1 out of the plurality of worm gear bodies 1, 1, 1, 1 that are arranged around the periphery of the wheel gear body 2 constantly meshes with the wheel gear body 2 at the center by rotating on an outer peripheral side, and rotational power from the plurality of input shafts 100, 100, 100, 100 is constantly transmitted to the wheel gear body 2.

Figure 14:
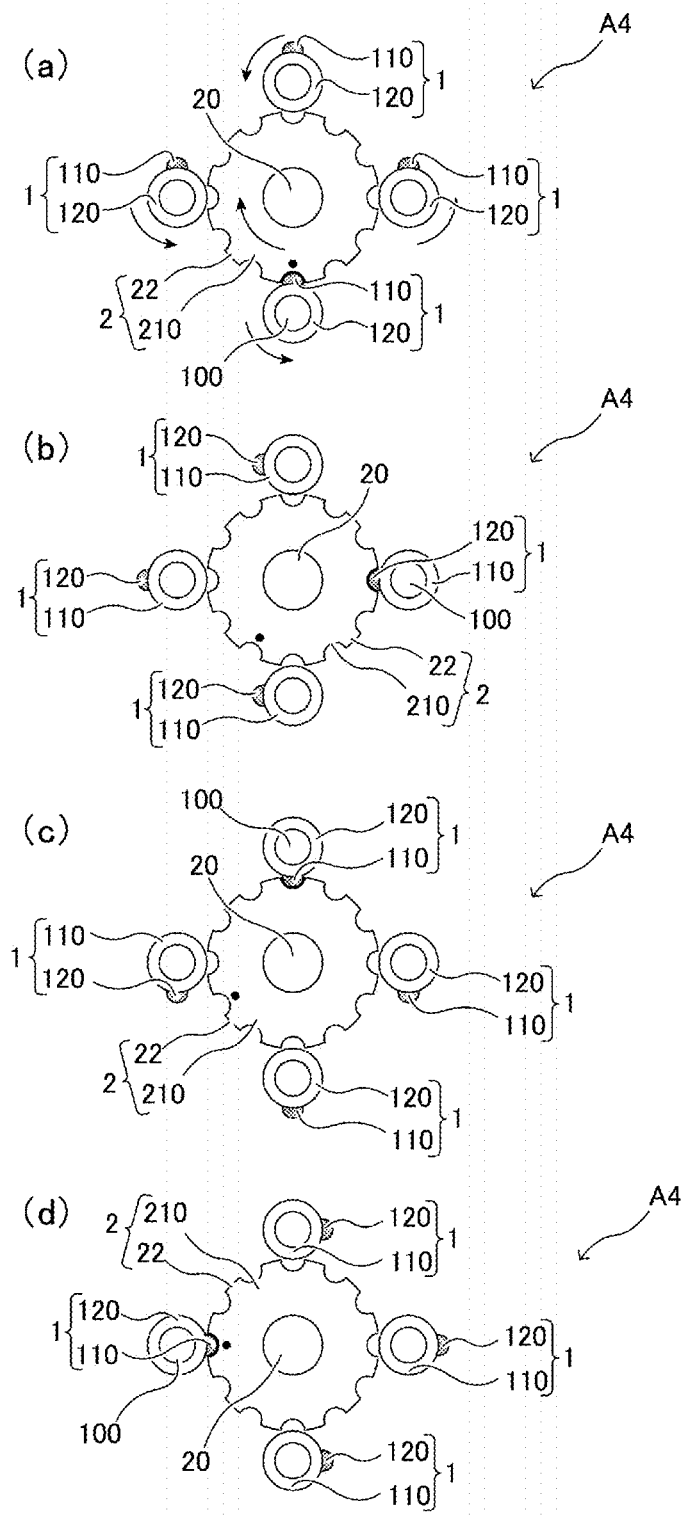
FIG. 14 is a schematic radially cross-sectional view of a worm gear body and a wheel gear body according to the fourth embodiment of the present invention.
Figure 15:
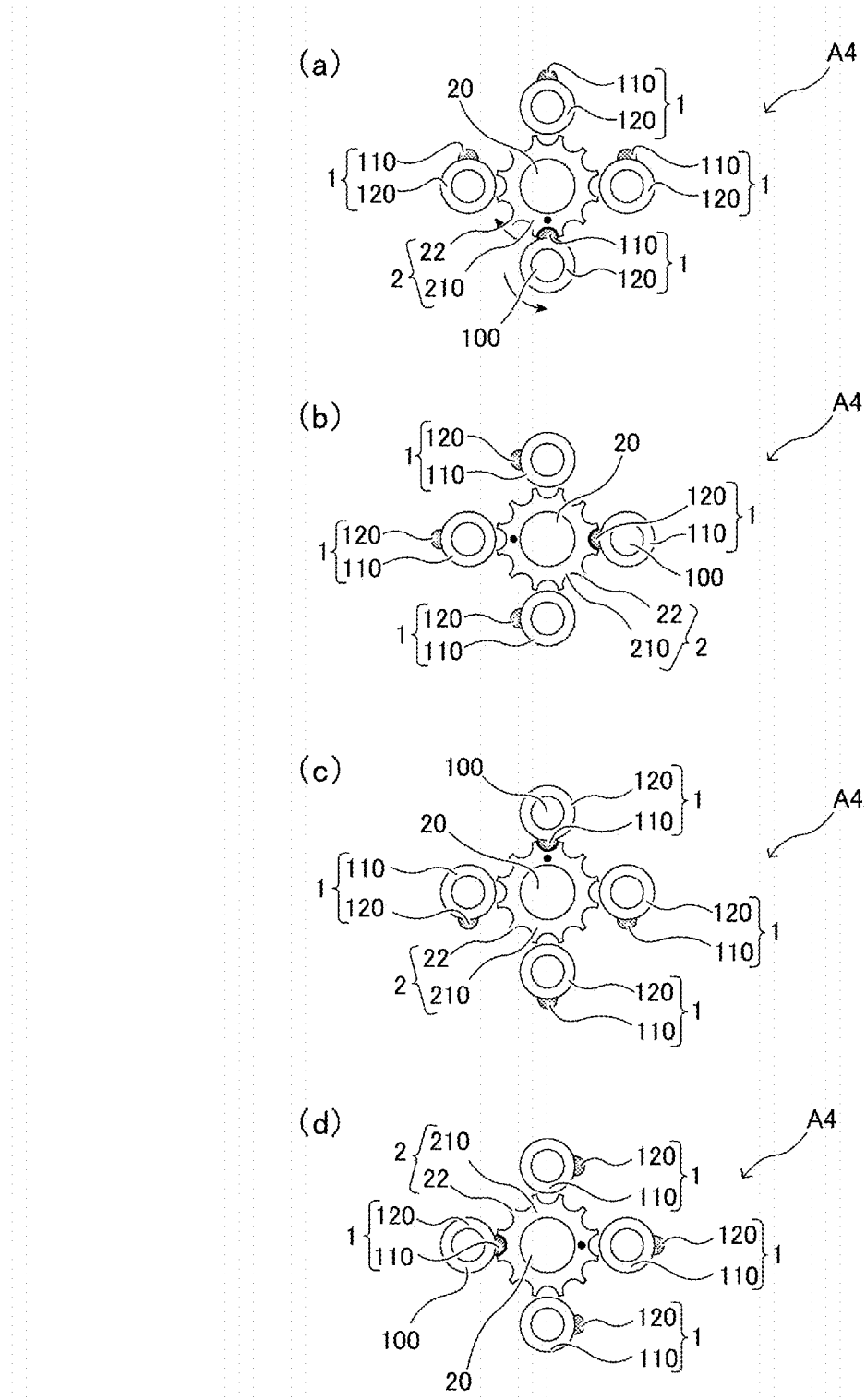
FIG. 15 is a schematic radially cross-sectional view of the worm gear body and the wheel gear body according to the fourth embodiment of the present invention.

To be more specific, as illustrated in FIG. 14(*a*) to FIG. 15(*d*), as viewed in the axial direction, the plurality of worm gear bodies 1, 1, 1, 1 are arranged on a left side, a right side, a front side and a rear side with respect to the wheel gear body 2 in a state where the protruding directions of the respective single gear teeth 120, 120, 120, 120 are set to the same direction.

For example, as illustrated in FIG. 14(*a*) and FIG. 15(*a*), in a state where the gear tooth 120 of the rear side worm gear body 1 meshes with the gear tooth 22 of the wheel gear body 2, the gear teeth 120, 120, 120 of other front, left, right side worm gear bodies 1, 1, 1 are in a separated (non-engaging) state.

That is, along with the synchronous rotation of the respective worm gear bodies 1, 1, 1, 1, the meshing between the respective worm gear bodies 1, 1, 1, 1 and the wheel gear body 2 is sequentially performed such that a meshing state between the right side worm gear body 1 and the wheel gear body 2 illustrated in FIG. 14(*b*) and FIG. 15(*b*), a meshing state between the upper side worm gear body 1 and the wheel gear body 2 illustrated in FIG. 14(*c*) and FIG. 15(*c*), a meshing state between the left side worm gear 1 and the wheel gear body 2 illustrated in FIG. 14(*d*) and FIG. 15(*d*) sequentially take place so that a rotational force is transmitted to the wheel gear body 2 disposed at the center thus continuously rotating the wheel gear body 2.

Depending on the meshing position between the respective worm gear bodies 1, 1, 1, 1 and the wheel gear body 2, a rotational diameter of the wheel gear body 2 is changed and hence, a gear ratio (rotational amount) is automatically changed whereby a rotational speed of the output shaft 20 can be decreased or increased.

That is, as illustrated in FIG. 13(*a*) and FIG. 14(*a*) to FIG. 14(*d*), in a case where the respective worm gear bodies 1, 1, 1, 1 are moved translationally along the respective input shafts 100, 100, 100, 100 so that the respective worm gear are positioned on a large diameter side of the wheel gear body 2, the wheel gear body 2 to which a rotational force is transmitted from the respective worm gear bodies 1, 1, 1, 1 on an input side increases a rotational torque of the output shaft 20 and, at the same time, decreases a rotational speed of the output shaft 20.

On the other hand, as illustrated in FIG. 13(*b*) and FIG. 15(*a*) to FIG. 15(*d*), in a case where the respective worm gear bodies 1, 1, 1, 1 are moved translationally along the respective input shafts 100, 100, 100, 100 so that the respective worm gear are positioned on a small diameter side of the wheel gear body 2, the wheel gear body 2 to which a rotational force is transmitted from the respective worm gear bodies 1, 1, 1, 1 on an input side decreases a rotational torque of output shaft 20 and, at the same time, increases a rotational speed of the output shaft 20.

In this manner, according to the continuously valuable transmission mechanism A4 of this embodiment, by moving the plurality of worm gear bodies 1, 1, 1, 1 along the tapered shape of the wheel gear body 2 thus changing the gear position on the peripheral side of the wheel gear body 2 at which the worm gear bodies 1, 1, 1, 1 mesh with the wheel gear body 2, a rotational force can be transmitted to the wheel gear body 2 from the worm gear bodies 1, 1, 1, 1 in a state where a rotational speed from the worm gear bodies 1, 1, 1, 1 can be changed in a continuously valuable manner without using a particular device such as an inverter.

REFERENCE SIGNS LIST

A: continuously variable transmission mechanism
1: worm body gear
10: input shaft
11: gear body
12: gear tooth
2: wheel gear body
20: output shaft
21: gear body
22: gear teeth

What is claimed is:
1. A continuously variable transmission comprising:
  a worm gear body that is formed such that a spiral pitch of a screw gear having a spiral shape and formed on a peripheral surface of a gear shaft body is gradually changed;
  a wheel gear body on an output side that is formed such that a meshing position where the wheel gear body meshes with the worm gear body is adjustable so as to allow the wheel gear body to mesh with the worm gear body at an arbitrary position; and
  an adjustment operation unit that is connected with the wheel gear body, the worm gear body, or both of the wheel gear body and the worm gear body in an interlocking manner so as to adjust the meshing position where the worm gear body and the wheel gear body mesh with each other, wherein
  a gear rotational speed from an input side is changeable to a gear rotational speed on the output side in a continuously variable manner by an operation of the adjustment operation unit, and
  the wheel gear body has gear teeth formed at a fixed pitch in a circumferential direction.

2. The continuously variable transmission according to claim 1, wherein the adjustment operation unit is configured to change an intersecting angle of the worm gear body and the wheel gear body.

3. The continuously variable transmission according to claim 1, wherein the worm gear body is disposed so as to be rotatable on one end of the worm gear body as an axis.

4. The continuously variable transmission according to claim 1, further comprising another worm gear body meshing with the wheel gear body.

* * * * *